Figure 1:
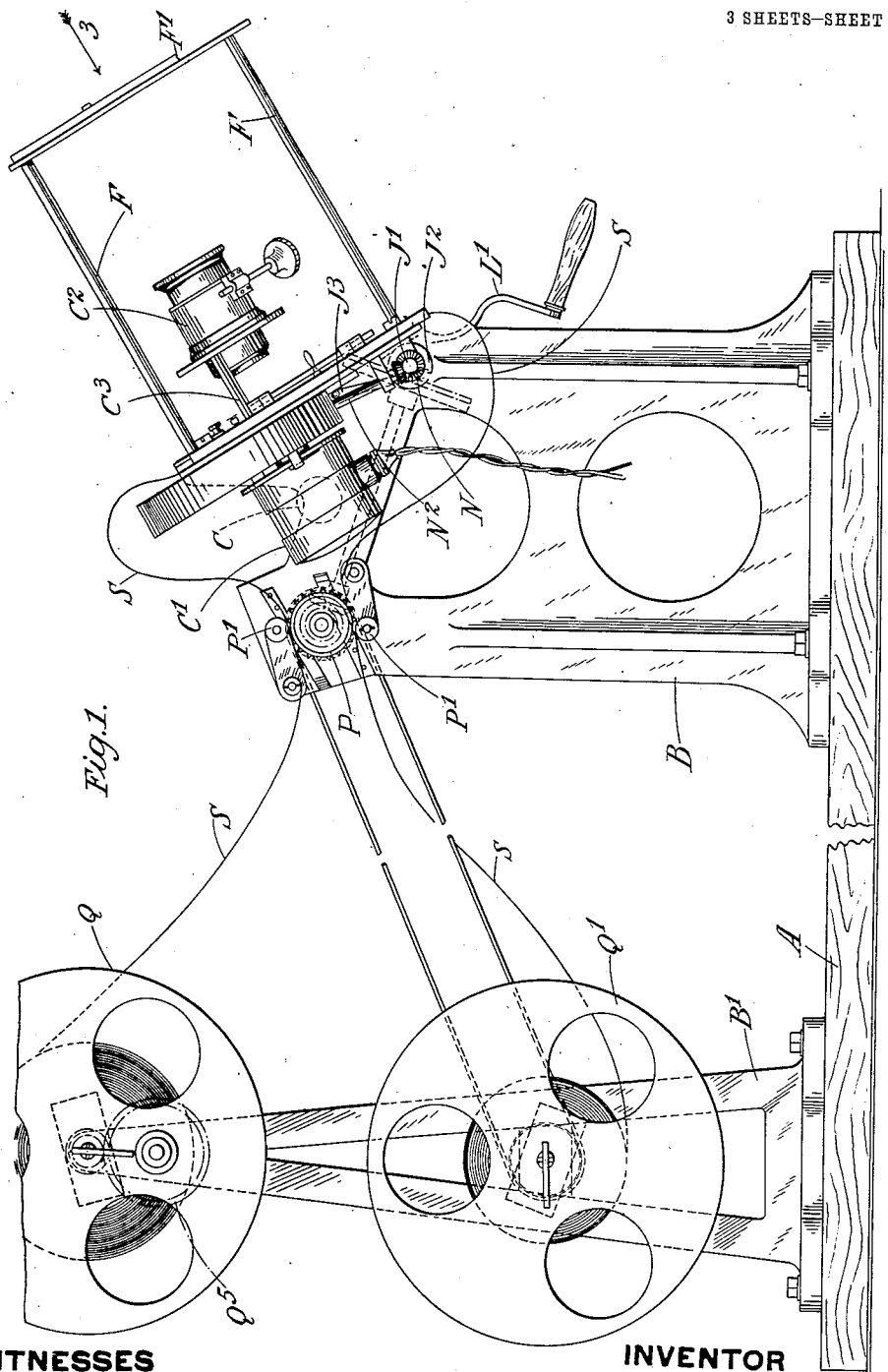

A. J. BOHRINGER.
CINEMATOGRAPH FILM INSPECTION OR HOME PROJECTION APPARATUS.
APPLICATION FILED MAR. 28, 1914.

1,128,841.

Patented Feb. 16, 1915.

3 SHEETS—SHEET 3.

WITNESSES

INVENTOR
Arthur John Bohringer
By Charles G. Cope
Atty.

UNITED STATES PATENT OFFICE.

ARTHUR JOHN BOHRINGER, OF HAMMERSMITH, LONDON, ENGLAND, ASSIGNOR TO THE FENNING FILM SERVICE LTD., OF LONDON, ENGLAND, A CORPORATION OF GREAT BRITAIN.

CINEMATOGRAPH FILM-INSPECTION OR HOME PROJECTION APPARATUS.

1,128,841.  Specification of Letters Patent.  Patented Feb. 16, 1915.

Application filed March 28, 1914. Serial No. 827,999.

*To all whom it may concern:*

Be it known that I, ARTHUR JOHN BOHRINGER, a subject of the King of Great Britain, residing at 40 Hamlet Gardens, Ravenscourt Park, Hammersmith, London, W., England, have invented certain new and useful Improvements in or Relating to Cinematograph Film-Inspection or Home Projection Apparatus, of which the following is a specification.

This invention is for improvements in or relating to cinematograph film inspection or home projection apparatus, and has for its object to provide a compact form of apparatus, so arranged that when the optical apparatus and the mask or "gate" can be readily brought into proper register, the light, the optical apparatus and the mask can together be readily removed so as to render the film accessible for repair or closer inspection. As the apparatus is mainly intended for film inspection, it is necessary that it shall be so constructed that the film may be readily accessible so that it can be easily taken out for repair and again replaced, and that all adjustments may be easily and quickly made. A single film may require repairing in several places throughout its length, and for each repair it is ordinarily necessary to remove it from the driving mechanism of the machine and replace it, after which the optical apparatus will probably need to be brought into readjustment, so that it follows that all the parts of the apparatus must be so arranged as to enable these operations to be carried out easily and quickly. The inspection apparatus being preferably made in the form of a small and compact portable unit, can be used for home projection, that is to say, it can easily be stood bodily on a table or other support and used to exhibit the films in a private house, as it is all self-contained except the screen, which can be either made part of the machine, or otherwise, as preferred.

In cinematograph apparatus as at present constructed the "gate" or mask is behind the film and the lens or the optical apparatus in front, and repairs can only be effected with difficulty, by removing the film from its guide device, whereas by rendering the film accessible from the front, repairs can be effected with the film *in situ.*

According to the present invention therefore the apparatus comprises the following parts, a guide through which the film is passed, a masking-device on the front of the guide capable of movement and adjustment relatively thereto, and optical apparatus to project a magnified image of the part of the film at the opening in the masking device, which optical apparatus is operatively connected with the masking-device to move therewith when the latter is moved. Preferably the masking-device takes the form of a plate hinged to the guide and carries the lens-tube of the optical apparatus, so that these parts can together be swung away from the film, or together brought into place over the film. This arrangement enables the guide to be opened from the front, that is the side on which the lens-tube is, instead of having to get at the film from the back. In full-size cinematograph machines, there is a considerable gap between the condensers of the optical apparatus and the back of the guide, so that the guide can be easily opened at the back and the film inserted or withdrawn, but with the present apparatus which it is desired to make as compact as possible, this space is reduced or if condensing lenses are not used, the source of light may be placed so close to the back of the guide that access thereto would be inconvenient; moreover, the guide is preferably placed in a horizontal or a sloping position instead of a vertical position, and stands at no great height from its base-board or plate, so that removing the film from the back of the guide would be inconvenient. If desired, a screen to receive the image projected by the optical apparatus may be so combined with the whole apparatus as to constitute a unitary device when pictures are being projected. This screen could be carried by a support secured to the hinged masking-plate, or it could be otherwise hinged or made removable for the purpose of being got out of the way when it is desired to withdraw the film. Preferably the guide is provided with an extension which constitutes an "operating table" and is covered by the hinged masking-plate when the latter is closed, step-by-step feed mechanism for feeding the film forward being borne on the under-face of this "operating table." The object of the "operating table" is to serve as a support for the film while it is being repaired, and by covering it with the masking-plate it is possible to place the feed-mechanism on the under side of it, as the masking-plate serves as a backing for the film against which the feed-mechanism works, and the apparatus is rendered more compact than would be the case if a separate portion of the guide had to be provided for the feed-mechanism and then a further portion for the "operating table."

A measuring-device and winding and rewinding mechanism may be comprised within the unitary apparatus which is part of the subject-matter of the present invention.

One method of carrying out this invention is hereinafter described with reference to the accompanying drawings, in which—

Figure 2:
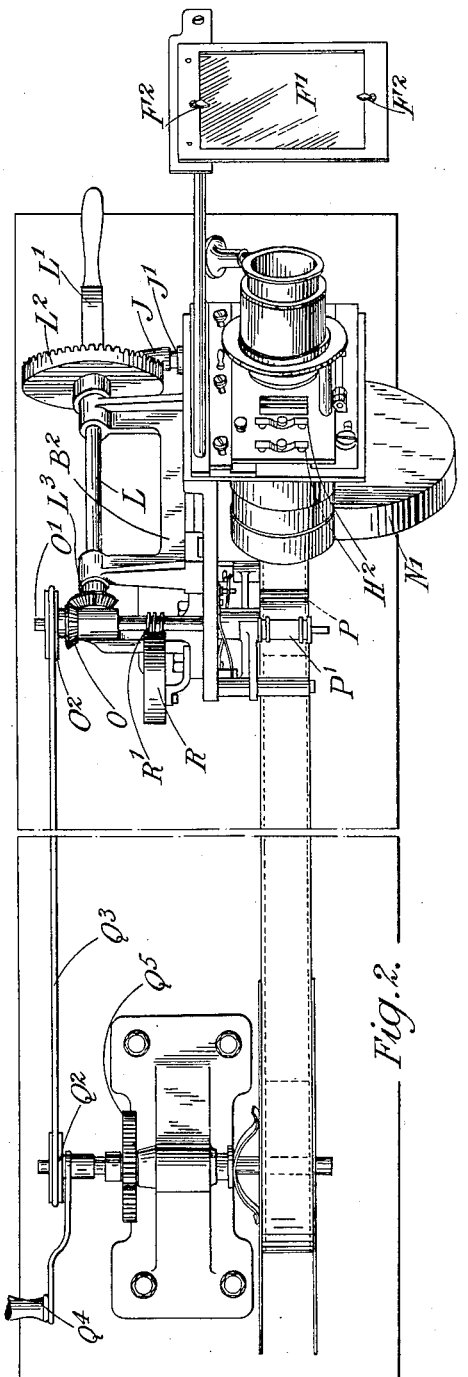
Figure 3:
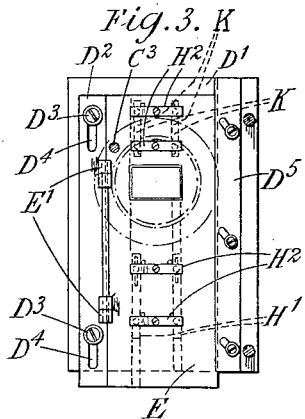

Figure 1 is a side elevation of a complete unitary apparatus; Fig. 2 is a plan of the parts seen in Fig. 1; Fig. 3 is an end elevation of the film guide and adjacent portions viewed in the direction of the arrow 3 shown in Fig. 1, and Fig. 4 is a perspective view, to an enlarged scale, of the parts shown in Fig. 3 but with the masking plate swung back.

Upon a base board A are carried two standards, a forward one B and a rearward one $B^1$, the forward standard B serving to support the optical system, the illuminant, and the means for imparting movement to and guiding the film, together with a screen when the latter forms a part of the unitary device. The rear standard $B^1$ supports the film spools. The illuminant is an incandescent electric lamp C inclosed within a cylindrical box $C^1$ carried on the rear of the film guide in such a manner as to project the light forward and upward in a direction inclined at about 30° with the horizontal. In the front portion of the box C is the usual condenser, which, however, is not shown in the drawings, and the remainder of the optical system is indicated at $C^2$ supported by a stem $C^3$ from the said film guide. The guide is in the front of a back plate D provided with side members in the form of bars $D^1$ $D^2$, the space between which constitutes a channel for the film. The left-hand side bar $D^2$ is secured to the back plate by screws $D^3$ engaging with slots $D^4$ which are formed in the side bar $D^2$ and thus permit adjustment of the position of the side bar $D^2$ in the lengthwise direction of the film channel. A masking plate E is hinged at $E^1$ to the bar $D^2$ and also carries the stem $C^3$. The masking plate is thus capable of swinging about the hinge $E^1$ until its right-hand edge is in engagement with the right-hand bar $D^1$ and the latter is provided with a sliding strip $D^5$ which serves to lock it in its closed position. From the front of the guide project two rods F which carry a screen $F^1$ which serves to receive the image thrown by the optical system. The screen is of ground glass and is readily detachable by operation of retaining clips $F^2$, as seen in Fig. 2. Toward the upper end of the back plate is an orifice G, considerably larger in the lengthwise direction of the film than the area of a single picture, while the masking plate is provided with an orifice $G^1$ large enough only to expose one picture at a time. The masking plate thus forms a front cover for the guide between which and the back plate the film travels in the closed channel thus formed. The back plate is extended downwardly to form an "operating table" at $D^6$, and on the back of this portion is a step-by-step mechanism of the well-known kind which drives the film by means of pawls H which are reciprocated in the manner hereinafter to be described; the pawls serve to engage with the perforations in the edges of the film in the well-known manner. On the under side of the masking plate spring-pressed guides $H^1$ are provided for the tips of the pawls, while spring presser-feet K further serve to hold the film flat in its channel. The guides $H^1$ and presser-feet K are carried on stems which project through the masking plate and are pressed downward by flat steel plate-springs $H^2$.

From the right-hand side of the standard B, as viewed from the front of the machine, projects a casting $B^2$ provided with brackets within which is journaled a spindle L which is the driving spindle for the whole apparatus. A crank handle $L^1$ is provided for driving purposes and on the spindle is mounted a large miter wheel $L^2$ toward the forward end and a small miter wheel $L^3$ toward the hinder end. The wheel $L^2$ is in engagement with a pinion J mounted on a horizontal spindle $J^1$ provided with a crank $J^2$ connected to the pawls H by a connecting rod $J^3$. The upper end of the connecting rod is connected to a cross-head, not shown in the drawings, upon which the pawls are mounted and which moves in guideways secured to the rear side of the back plate D. The channel for the film is furnished with steel facings M to take the wear caused by the film. On the end of the shaft $J^1$, remote from the wheel $L^2$, is a bevel gear N by which a shutter of known construction, comprised within a housing $N^1$, is operated by a spindle $N^2$. The wheel $L^3$ engages with a wheel O upon a spindle $O^1$, upon the other end of which is mounted a sprocket roller P, and close to the wheel O is mounted a pulley $O^2$ secured to the spindle $O^1$. Spring-controlled guide rollers $P^1$ serve to hold the film in proper engagement with the sprocket roller P. The film spools are shown at Q Q¹, the lower one Q being the winding-on spool, and this is driven by a pulley Q² upon its spindle by the medium of a band Q³ connecting the pulleys Q² O². The spindle of the winding-off spool Q is provided with a detachable crank handle Q⁴ for the purpose of winding the film back. Upon the spindle O¹ is a worm R¹ engaging with the driving wheel of a measuring mechanism R of well-known construction, so that as the spindle O¹ rotates indication is given on the dials of the mechanism R indicating the number of feet of film that have been passed by the sprocket roller P.

Figure 4:
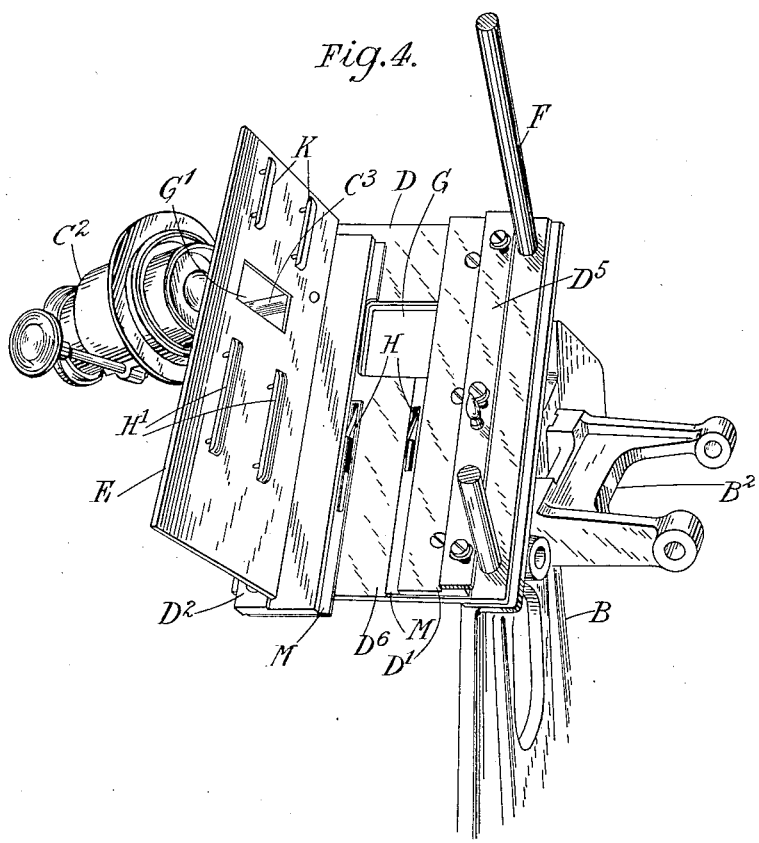

In use the sliding bar D⁵ is moved to permit the masking plate E to be swung open into the position shown in Fig. 4, and film, as shown at S, is led from a full spool Q under the upper guide roller, over the sprocket drum P, down through the channel formed by the parts D D¹ D², then backward between the other guide roller P¹ and sprocket drum, and so on to the winding-on spool Q¹. The masking plate is then closed and secured in position by the locking plate D⁵ and, by means of the adjustment afforded by the slots D⁴, the orifice G¹ is brought into register with a picture on the film when the latter is in a position in which it is left at rest momentarily by the action of the pawls H. The action of the springs H² serves to keep the film flat and taut without unduly stressing it. The incandescent lamp having been connected to a suitable source of supply, the handle L¹ is rotated and a series of pictures thereby projected in the usual manner. If the screen F¹ is in position this receives the projected images and these may be examined as the handle is rotated and the film by these means inspected. Should a defect be discovered, rotation of the handle is stopped and the locking plate D⁵ having been slipped on one side the masking plate is swung open and a repair effected upon the "operating table" D⁶. As the projection continues the slack film is taken up by the spool Q¹, which is driven through the band Q³, while fresh film is fed forward by the sprocket drum P and the latter serves also to feed the film back in readiness for taking up by the spool Q¹. If the illuminant employed be sufficiently powerful, the apparatus will serve as a unitary device for projection at relatively short distances, such as obtain in a private house, and the apparatus is thus suited for what may be called home projection. When the projection is completed, the film may be wound off from the spool Q¹ back on to the spool Q by unshipping the band Q³ and using the handle Q⁴; multiplying gear Q⁵ is provided so that this operation may be rapidly and easily performed.

It will be appreciated that with the hereinbefore described construction of apparatus, the lens tube necessarily moves with the masking plate whether the latter be swung back about its hinge or whether it be adjusted in the lengthwise direction of the film, and the optical system, once adjusted, is thus kept in proper adjustment in spite of any such movements of the masking plate. The orifice in the masking plate, if used for inspection purposes, must be large enough to allow projection of an image of the perforations in the film as well as of the picture, but for the purposes of projection for display, for example, for home use, an orifice large enough only to allow the picture to be seen is wanted. For this purpose the plate may be provided with a subsidiary mask to reduce the working orifice from one which shows the perforations to one in which these are hidden, or, alternatively, two masking plates may be employed, one for one purpose and the other for the other, substitution of one for the other being readily effected by withdrawing the hinge pin. If a screen is not included in the apparatus, a prism or other reflector may be employed to throw the image on to a vertical wall, and it will be observed that whether a screen be provided on the apparatus or whether an ordinary screen in a vertical position on a wall be employed the construction of apparatus is small and compact and, when constructed with a screen, is entirely self-contained; it is thus admirably suited for use at home, that is to say in a private house, since, moreover, the illuminant may be an ordinary incandescent lamp provided with an adapter for connection to any lighting system.

Instead of employing a shutter any well-known device may be employed operated by means of the crank spindle L to switch the light on and off in proper correspondence with the movements of the films, so as to prevent the ghost effect which is otherwise sometimes produced by that movement.

What I claim and desire to secure by Letters Patent is:—

1. In a cinematograph apparatus a film guide, a masking device removably mounted on the guide and a lens carrier mounted on the masking device substantially as set forth.

2. In a cinematograph apparatus a film guide, a masking device hinged to said guide and a lens carrier mounted on the masking device, substantially as set forth.

3. In a cinematograph apparatus a film guide, a masking device removably mounted on that side of the guide which is remote from the light source and a lens carrier mounted on the masking device, substantially as set forth.

4. In a cinematograph apparatus a film guide plate, an extension of said plate forming an operating table, a removably mounted masking device covering said guide plate and extension and a lens carrier mounted on the masking device plate substantially as set forth.

5. In a cinematograph apparatus a film guide plate, an extension of said plate forming an operating table, a removably mounted masking device covering said guide plate and extension, a film step-by-step-feed mechanism carried in the underside of said table and a lens carrier mounted on the masking device plate substantially as set forth.

6. In a cinematograph apparatus a film guide, a masking device removably mounted on the guide, a lens carrier mounted on the masking device and a projection screen mounted on said guide substantially as set forth.

7. In a cinematograph apparatus a film guide, a masking device hinged on the guide, a lens carrier mounted on the masking device and a projection screen mounted on said guide substantially as set forth.

8. In a cinematograph apparatus a film guide plate, an extension of said plate forming an operating table, a removably mounted masking device mounted on and covering said guide plate and extension and a projection screen also mounted on said guide substantially as set forth.

9. In a cinematograph apparatus a film guide, film unwinding and rewinding mechanism, a masking device removably mounted on the guide and a lens carrier mounted on the masking device substantially as set forth.

In testimony whereof I have affixed my signature in presence of two witnesses.

ARTHUR JOHN BOHRINGER.

Witnesses:
BERTRAM JOHN ALLEN HEXHAN,
DOROTHY JACKSON.

---

Correction in Letters Patent No. 1,128,841.

It is hereby certified that in Letters Patent No. 1,128,841, granted February 16, 1915, upon the application of Arthur John Bohringer, of Hammersmith, London, England, for an improvement in "Cinematograph Film-Inspection or Home Projection Apparatus" an error appears in the printed specification requiring correction as follows: Page 4, lines 3 and 12, strike out the word "plate"; and that the said Letters Patent should be read with this correction therein that the same may conform to the record of the case in the Patent Office.

Signed and sealed this 30th day of March, A. D., 1915.

[SEAL.]

J. T. NEWTON,

*Acting Commissioner of Patents.*